Figure 1:
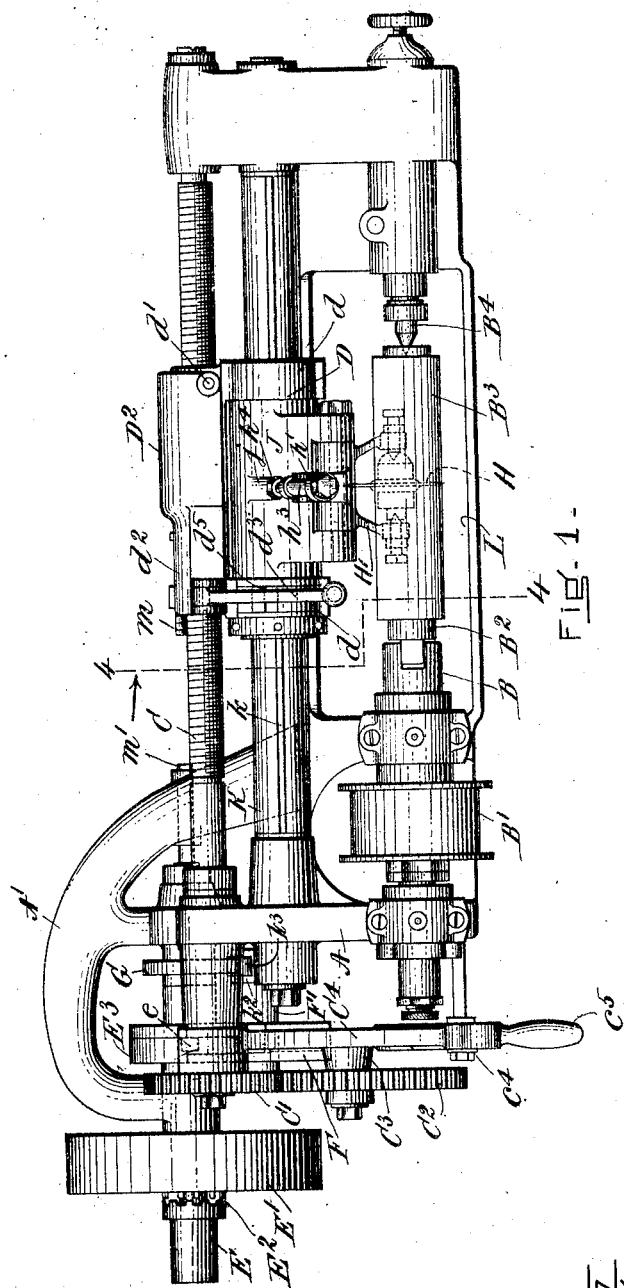

A. J. WILLS.
AUTOMATIC JAR RING LATHE.
APPLICATION FILED DEC. 8, 1911.

Patented Aug. 27, 1912
3 SHEETS—SHEET 1.

A. J. WILLS.
AUTOMATIC JAR RING LATHE.
APPLICATION FILED DEC. 8, 1911.

1,036,763.

Patented Aug. 27, 1912.
3 SHEETS—SHEET 2.

WITNESSES:
M. E. Flaherty
J. J. Kenneally

INVENTOR:
Arthur Jackson Wills
By
Everett Hayes
his attorneys.

UNITED STATES PATENT OFFICE.

ARTHUR JACKSON WILLS, OF BROOKFIELD, MASSACHUSETTS, ASSIGNOR TO THE B & R RUBBER COMPANY, OF NORTH BROOKFIELD, MASSACHUSETTS, A CORPORATION OF MASSACHUSETTS.

AUTOMATIC JAR-RING LATHE.

1,036,763.  Specification of Letters Patent.  Patented Aug. 27, 1912.

Application filed December 8, 1911. Serial No. 664,537.

*To all whom it may concern:*

Be it known that I, ARTHUR JACKSON WILLS, of Brookfield, in the county of Worcester and State of Massachusetts, a citizen of the United States, have invented a new and useful Improvement in Automatic Jar-Ring Lathes, of which the following is a specification.

My invention relates to a lathe for cutting rubber rings or washers for packing the joint between the top of a glass jar and its cover although it is equally applicable to cutting washers of other sizes or ordinary elastic rings or any sections of rubber. It may also easily be adapted for other like uses. The rings or washers in question are cut of the required thickness from a rubber tube of proper size. The piece of tube from which the washers are to be cut is ordinarily placed upon a mandrel and given rotation at convenient speed and a knife is applied to the tube to perform the necessary cutting operation. The mounting and rotation of the mandrel may be accomplished in any one of a number of ways and will not be described in detail as it is common in the art. The knife is ordinarily mounted in a carriage which is given an intermittent feed lengthwise of the tube according to the desired thickness of the washers and the length of travel of the carriage at each feeding operation must be positive and accurate in order that the washers shall all be cut of exactly the same thickness.

In machines heretofore constructed so far as I am aware, the feed of the carriage has not been exact as the carriage is apt to overrun its feed and hence the product of these machines has not been satisfactory at all times because the rings have not been of the same thickness.

My invention hereinafter described relates more particularly to means adapted to control the carriage feed, the embodiment of my invention shown in the drawings not only performing the feeding operation with the required speed, say 150 feeds a minute, but also locking the parts at the moment each feed is concluded in such a way that each feeding movement is of exactly the same length. This and other details hereinafter referred to constitute my invention.

While the machine described shows the preferred embodiment of my invention, I do not mean to limit myself to the construction shown as other means may be utilized to accomplish the result in substantially the same way.

My invention then will be understood by reference to the drawings, in which the preferred embodiment is shown.

Figure 2:
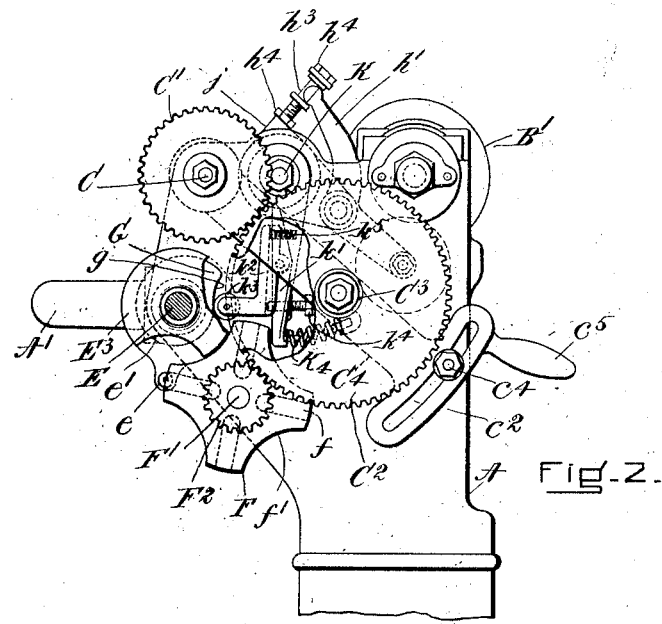
Figure 3:
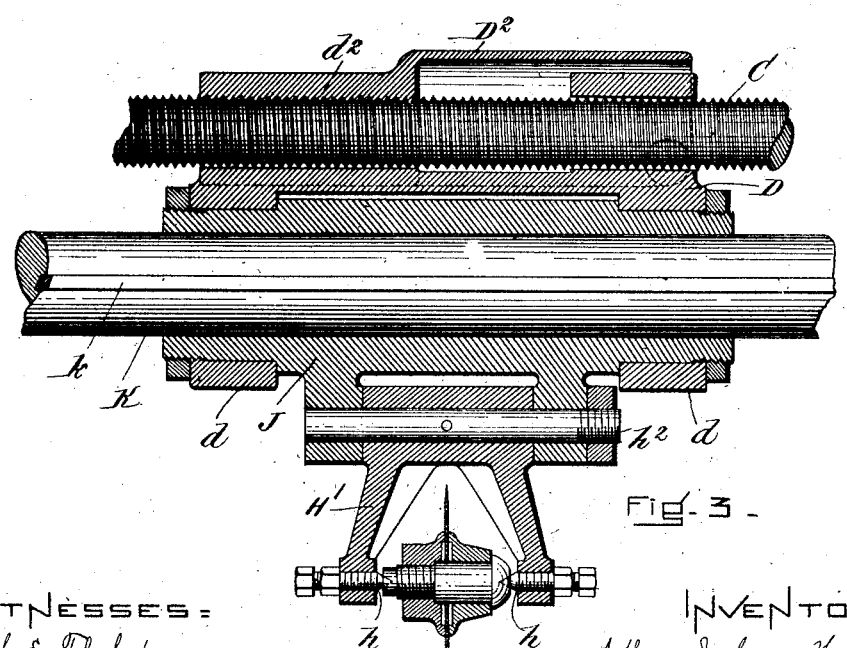
Figure 4:
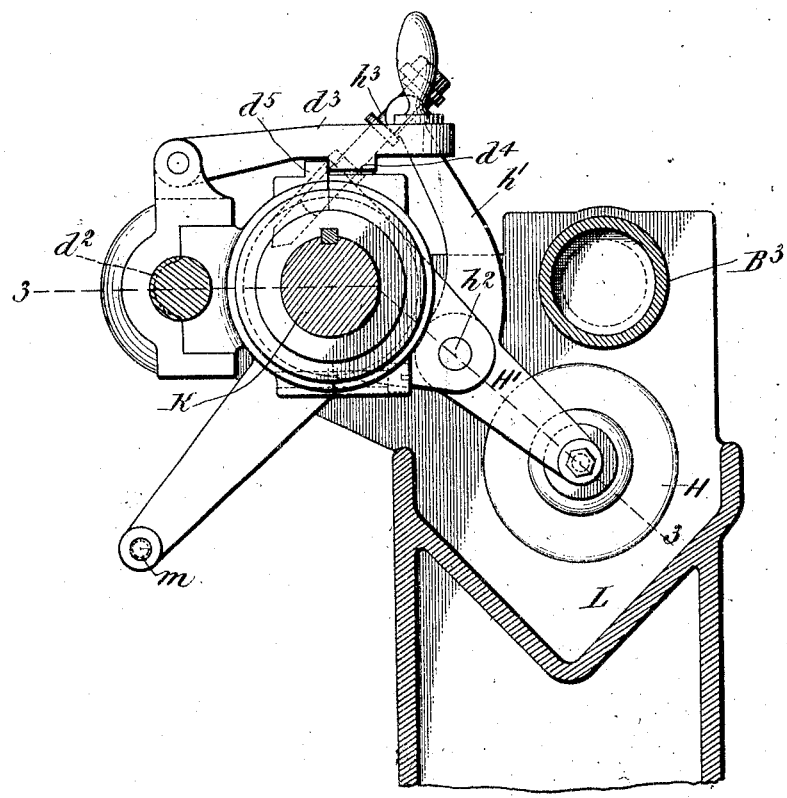

Figure 1 is a plan of such a machine. Fig. 2 is an end elevation, the intermediate gear being broken away to show the parts behind it. Fig. 3 is a section on line 3—3 of Fig. 4, and Fig. 4 is an enlarged section on line 4—4 of Fig. 1.

A is the general frame of the machine which has bearings for the shafts and the usual supports for the various parts and also carries the bracket arm $A^1$ to furnish bearings for the cam shaft.

B is the head stock carried by the mandrel shaft which shaft is provided with a pulley $B^1$ by means of which power is supplied thereto from any desired source. The mandrel $B^2$ is carried between the head stock B and the tail stock $B^4$ and on the mandrel is mounted the work in the form of a rubber tube shown at $B^3$. The rotation of the mandrel is continuous during the cutting operation.

C is the threaded feed shaft by means of which the carriage D is fed intermittently so that the knife mounted on the carriage may engage the rubber tube to cut it at the proper place. The carriage D carries a half nut $d^2$ which engages the thread on the feed shaft as below described so that the carriage D can only move when the feed shaft is turned. The feed shaft C has an intermittent movement and for this purpose carries at its rear end a gear $C^1$ which meshes with the intermediate gear $C^2$ mounted on the stud $C^3$ carried on an arm $C^4$ hung on the shaft C so that the gears $C^1$ and $C^2$ are always in mesh. The intermediate gear $C^2$ derives its movement in the following way: The shaft E carries the pulley $E^1$ to which power is supplied by belting, a clutch $E^2$ connecting the shaft with the pulley. On the same shaft E is mounted a disk $E^3$ carrying a stud having on it a roller $e$. F is a star wheel mounted on a stud $F^1$, each arm of said star wheel being grooved on one face as at $f$, the grooves in question being of proper size to receive the roller $e$ on the disk $E^3$ and as shown being four in number. As the disk $E^3$ rotates, once in each rotation the roller $e$ passes into one of the grooves $f$ and carries the star wheel F with it a quarter of a turn, the disk $E^3$ being cut away as at $e^1$ to allow the arm of the star wheel to overlap the disk. Between the arms of the star wheel F the periphery of the star wheel is curved as at $f^1$ to correspond with the curve of the disk $E^3$ so that the star wheel F is locked except when it is being moved by the roller $e$. On the stud $F^1$ upon which the star wheel F is mounted there is also carried a pinion $F^2$ which is in mesh with the intermediate gear $C^2$. This mechanism operates in the following manner: The pulley $E^1$ is continuously rotated by power applied through the belt referred to and when the clutch $E^2$ is in engagement the disk $E^3$ rotates continuously and with each turn the roller $e$ enters a groove $f$ in one of the arms of the star wheel F and gives it a quarter turn, bringing the next groove $f$ into position to be engaged by the roller $e$ on the next rotation of the disk $E^3$. The roller $e$ passes out from the groove $f$ as the disk $E^3$ continues its rotation leaving the star wheel locked because of the engagement of one of its surfaces $f^1$ with the periphery of the disk $E^3$ until the rotation of the disk $E^3$ brings the roller into position to engage the groove in the next arm. The rotation of the star wheel F causes the rotation of the intermediate gear $C^2$ by means of the pinion $F^2$ which is attached to the star wheel. The gear $C^2$ acts on the gear $C^1$ and causes the rotation of the feed shaft, but because of the construction of the star wheel F and its relation to the disk $E^3$ the movement of the feed shaft is necessarily limited in extent and, however fast the motion of the star wheel, it is immediately locked and the motion of the shaft ceases the minute the roller $e$ emerges from the slot $f$, thus stopping the carriage D instantly and also starting it with equal promptness.

G is a cam mounted upon the cam shaft E which feeds the knife or cutter H to and into the work and allows it to drop back again when the cut is finished. The cutter H is free to rotate between the ends of screw studs $h$ mounted in forks on a frame $H^1$ which forms part of the tool carrier J, and is hinged thereto by the pin $h^2$. The tool carrier J comprises a sleeve which fits on splines $k$ on the rock shaft K so that it will slide freely thereon. This sleeve is mounted in rings $d$ which form part of the casing D, so that it may have a rocking movement with the rock shaft independent of the carriage. The carriage has a long groove therein which partly surrounds the feed shaft C, but does not engage its threads. The carriage has what may be termed a cover $D^2$ hinged thereto at $d^1$, a portion $d^2$ of which is threaded to form a half nut which engages the threads of the feed shaft C. Thus when the parts are in the position shown in Fig. 3 the half nut $d^2$ engages the feed shaft and when the feed shaft is turned the carriage and cutter will be fed, but will stop instantly when the rotation of the feed shaft stops. This carriage cover $D^2$ is locked by a locking handle $d^3$ having a shoulder $d^4$ which engages with a corresponding shoulder or lock $d^5$ on the carriage. When it is desired to disengage the carriage from the feed shaft the handle is thrown back, thus throwing out the half nut $d^2$ from engagement with the threads on the feed shaft, allowing the carriage to be returned to its original position or otherwise moved as desired.

A rocker arm $k^1$ depends from the end of the rock shaft K and to it is pivoted a bent cam lever $k^2$ carrying at its bent end a cam roll $k^3$. Behind its bent end is a set screw $k^4$ by which it may be adjusted toward and from the cam surface $g$ on the cam G. A spring $k^5$ engages the other end of the cam lever $k^2$ so as to hold the lever and the set screw $k^4$ in contact. As the cam shaft E and cam G rotate the rock shaft K is oscillated, the path of oscillation of the rock shaft being adjusted by the set screw $k^4$. This of course also adjusts the path of movement of the cutter toward and away from the work, but in addition I provide the following adjustment of the cutter with relation to the rock shaft: The frame $H^1$ carries an arm $h^1$ which is forked at its upper end so that it may straddle a screw pin $h^3$ the lower end of which sets into a socket $j$ in the tool carrier J. The pin $h^3$ carries nuts $h^4$ by turning which the position of the frame $H^1$ is adjusted with relation to the tool carrier J so as to govern the depth of the cut made by the cutter H. In practice I first adjust the movement of the cutter with considerable accuracy by means of the pin $h^3$ and nuts $h^4$ and make the prior adjustment by means of the set screw $k^4$ by means of which the movement of the rock shaft is controlled. A spring $K^4$ connecting the arm $k^1$ with the frame holds the rock shaft, etc., so that the cutter is normally out of engagement with the work. The shape of the surface of the cam G with which the cam rod $k^4$ engages is such as to give a proper rocking movement to the rock shaft K and hence to the tool carrier J so that the cutter will be moved against and into the work and when the cut is finished will drop out of the way so that the feed may take place at once. The weight of the cutter will ordinarily be sufficient to insure the returning of the rocker arm to withdraw the cutter from the work, but the use of the spring $K^4$ is desirable to insure the quick return of the cutter from its cutting position so that the feed of the cutter may begin as soon as possible. Immediately thereafter the feed takes place. The cutter itself operates by frictional contact with the rotating work induced by the cam G which moves the rock shaft. As it is desirable that in work of this kind the cutter should be kept constantly wet a tank L is provided which being filled with water to a sufficient height keeps the cutting edge sufficiently wet. The length of the tank should of course approximate the ordinary length of the piece of rubber tubing to be cut. A head over the tank is desirable to prevent the cutter in its rotation from throwing water.

In order that the extent of feed may be adjusted according to the desired thickness of the jar ring, provision is made for changing the gear $F^2$ and adjusting the intermediate gear as may be necessary to keep it in mesh both with the change gear $F^2$ and the gear $C^1$. For this purpose the intermediate gear is as above described mounted upon a stud $C^3$ on the arm $C^4$. The outer end of this arm is provided with a slotted extension, its slot $c^3$ being concentric with the feed shaft C. A set screw $c^4$ is provided by which after the gear $F^2$ has been changed the parts may be adjusted so that the intermediate gear $C^2$ may be placed in mesh with the gears by which it is to be operated and with which it is to operate. A handle $c^5$ attached to the arm $C^4$ is useful in making this adjustment.

The general operation of the machine as herein described is as follows: A piece of rubber tubing $B^3$ to be cut is placed upon the mandrel and the mandrel is placed in the lathe, the tail stock being caused to approach the head stock to clamp the work in the ordinary way. Power applied to the pulley $B^1$ causes the continuous rotation of the mandrel. The thickness of the washers to be cut being determined, the proper change gear $F^2$ is placed upon the shaft $F^1$, the arm $C^4$ being adjusted in place accordingly and being clamped by the clamp screw $c^4$. Power being then applied to the pulley $E^1$ on the shaft E the clutch $E^2$ is engaged and the cam G and the star gear F are set in motion. The swelling of the cam gives to the rocker arm $k^1$ the necessary rocking movement and thus rocks the rock shaft K and cutter H toward and from the axis of the rotating mandrel carrying the rubber tube; and the rotation of the disk $E^3$ causes the intermittent rotation of the star gear F, the relations of these movements being such that the star gear is rotated at the moment when the cutter has completed its cut and has dropped away from the work so that after each cut the movement of the star gear will impart a feeding movement to the carriage and consequently will place the cutter in position to make its next cut, but will avoid feeding so long as the cutter is in the work. By virtue of the locking of the star gear at the moment its rotating movement has finished it is impossible for the carriage to be thrown any farther than is required for the purpose of the feed as it is in positive engagement with the feed shaft. Each movement of the carriage therefore is of identically the same length and upon reaching the end of its movement it is impossible for it to be carried any farther because of momentum or for any other reason. In this respect my machine differs essentially from any machine of this character of which I have knowledge.

Heretofore various methods of feeding a carriage have been tried, by means of a ratchet for example, etc., but the difficulty has always been to prevent the carriage from overrunning because of back lash or other similar reason. In lathes of this character the speed of rotation should be such that 150 cuts are made a minute, and if the carriage is of any material weight the momentum acquired by it is very hard to be overcome when the stopping of the carriage is required and various means such as springs and weights have been applied with the endeavor to accomplish this end, but of course every such addition to the carriage while it increases its weight in fact increases its momentum and also increases its inertia so that more power is needed to start the carriage and power is needed to stop it as well. In the above described machine the carriage may be made as light as is consistent with strength, and its movements are easily controlled by the means described.

I do not describe the clutch shown as any form of clutch which may be engaged by the carriage at the end of its travel may be employed. As shown the carriage is provided with a screw $m$ which provides an adjustable abutment to engage a projection $m^1$ on the clutch when the carriage has reached the end of its movement (it feeds to the left, see Fig. 1) and disengage it, so that power will be disconnected from the feed. When this has taken place the mandrel is removed, a new mandrel with new work put in place, the cover $D^2$ disengaged and the carriage moved back to its starting position, and the clutch and half nut reëngaged when the cutting operation will be recommenced.

What I claim as my invention is:—

1. In a machine of the character specified, a threaded feed shaft, means for giving it an intermittent rotary movement comprising a rotary disk and a star gear connected to said feed shaft and means whereby said disk shall impart an intermittent movement to said star gear and means whereby said star gear shall be locked between its intermittent movements, in combination with a tool carrier and means for supporting it to move horizontally and means for connecting said tool carrier and said feed shaft.

2. In a machine of the character specified, in combination, a threaded feed shaft, a star gear connected thereto, a constantly rotating disk having a recess in one face and carrying a projection, the arms of said star gear being provided with grooves to receive in turn said projection whereby said star gear will be given a rotary movement, said star gear having surfaces adapted to engage the edge of said disk when said projection is not in one of said grooves whereby at such time said star gear will be locked and will lock said feed shaft, a tool carrier, means for supporting it to move horizontally and means for connecting it with said feed shaft whereby it will be given a horizontal intermittent feed and will be locked at the close of each feed.

3. In a machine for cutting rubber rings, the combination with a rotating mandrel to carry a rubber tube to be cut, a rock shaft, a tool carrier slidable thereon and provided with a rotary cutter, means for oscillating said shaft for the purpose of moving the said cutter toward and from said mandrel, a threaded feed shaft engaging said tool carrier for the purpose of moving the latter longitudinally of said rock shaft, and means for positively locking said feed shaft against rotation between its intermittent movements.

4. In a machine for cutting rubber rings, the combination with a rotating mandrel to carry a rubber tube to be cut, a rock shaft, a tool carrier slidable thereon and provided with a rotary cutter, means for oscillating said shaft for the purpose of moving the said cutter toward and from said mandrel, a threaded feed shaft engaging said tool carrier for the purpose of moving the latter longitudinally of said rock shaft, and means for positively locking said feed shaft against rotation between its intermittent movements, said rotating and locking means for said feed shaft comprising a continuously rotating disk, a gear on said feed shaft, a star gear operated from said continuously rotating disk and having concave portions adapted to be engaged by the periphery of said disk, to lock said star gear against movement at intervals, a changeable gear rotating with said star gear, and an intermediate gear.

ARTHUR JACKSON WILLS.

Witnesses:
A. K. PECOT,
F. A. FULLAM.